United States Patent [19]
Kusano et al.

[11] Patent Number: 5,229,578
[45] Date of Patent: Jul. 20, 1993

[54] HEATER ACTIVATING APPARATUS WITH A SWITCHABLE CURRENT CONTROLLING ELEMENT

[75] Inventors: Akihisa Kusano, Kawasaki; Junichi Kimizuka, Yokohama; Kazuhiko Okazawa, Kawasaki; Kaoru Sato, Yokohama; Toshiyuki Ito, Sagamihara; Toshihiko Inuyama, Fujisawa; Makoto Abe, Kashiwa, all of Japan

[73] Assignee: Canon Kabushiki Kaisha, Tokyo, Japan

[21] Appl. No.: 581,909

[22] Filed: Sep. 13, 1990

[30] Foreign Application Priority Data
Sep. 14, 1989 [JP] Japan .................................. 1-239720

[51] Int. Cl.⁵ ............................................. H05B 1/02
[52] U.S. Cl. ................................... 219/497; 217/492; 217/501; 217/505; 323/908
[58] Field of Search ............... 219/508, 212, 505, 216, 219/497, 499, 492, 501; 323/901, 908

[56] References Cited

U.S. PATENT DOCUMENTS

| | | |
|---|---|---|
| 3,465,961 | 9/1961 | McBride, Jr. ............................. 236/9 |
| 3,559,883 | 2/1971 | Buiting et al. ....................... 219/505 |
| 3,684,172 | 8/1972 | Evalds ............................... 317/133.5 |
| 3,699,308 | 10/1972 | Hutchinson et al. ............... 219/497 |
| 3,937,922 | 2/1976 | Hamstra ............................... 219/501 |
| 4,196,356 | 4/1980 | Kabat ................................... 307/117 |
| 4,493,298 | 1/1985 | Kawamura .......................... 219/492 |

FOREIGN PATENT DOCUMENTS 2925947 1/1981 Fed. Rep. of Germany .

Primary Examiner—Mark H. Paschall
Attorney, Agent, or Firm—Fitzpatrick, Cella, Harper & Scinto

[57] ABSTRACT

A heater activating apparatus includes a power source, a heater heated to which is applied to voltage from the power source, and a current regulating element. The voltage from the power source is applied to the heater through the current regulating element when the heater is initially to energized, and thereafter, the voltage is applied to the heater without passing through the current regulating element.

24 Claims, 6 Drawing Sheets

HEATER ACTIVATING APPARATUS WITH A SWITCHABLE CURRENT CONTROLLING ELEMENT

BACKGROUND OF THE INVENTION

1. Field of the Invention

The present invention relates to a heater activating apparatus for activating a heater such as a halogen heater and the like, and more particularly, it relates to a heater activating apparatus for activating a heater so that a heating element heated by the heater is maintained at a predetermined temperature.

2. Related Background Art

Recently, in an image forming apparatus such as an optical printer copying machine, a heat fixing device wherein a toner image is heated or heated and pressurized by a heating element such as a heat roller which surface is maintained at a predetermined temperature has widely been used.

An example of a heater activating circuit which is used with such heat fixing device and which provides a background of the present invention is shown in FIG. 7.

In FIG. 7, the reference numeral 1 denotes an AC voltage source; 2 denotes a switch; 3 denotes a halogen heater; 4 denotes a large electric power thermistor (referred to as "power thermistor" hereinafter); 5 denotes zero cross-controlled SSR (solid state relay); 6 denotes a thermistor for detecting a temperature of the heater; 7 denotes a comparator having an open collector output; 8 denotes a transistor; and 9 through 13 denote resistors.

Next, an operation of the above mentioned heater activating circuit will be explained.

When the switch 2 is turned ON, the voltage $V_3$ becomes a GND level (i.e., earthed), the transistor 8 goes to an OFF condition, and a light emitting element 5b of the SSR 5 also goes to an OFF condition. Since a triac 5a of the SSR 5 is in an OFF condition when the light emitting element 5b is turned OFF, the voltage is not applied to the heater.

On the other hand, when the switch 2 is turned OFF, the voltage $V_1$ is determined by the partial voltage of the resistor 9 and the temperature detecting thermistor 6. That is to say, when the temperature of the thermistor 6 is decreased the value of $V_1$ is reduced, and, when the temperature of the thermistor 6 is increased the value of $V_1$ is also increased. If the voltage $V_1$ is lower than a voltage $V_2$ of the other input terminal of the comparator 7, the output $V_3$ of the comparator 7 will be HIGH. In this case, since the transistor 8 is turned ON, the light emitting element 5b is also turned ON. Since the SSR 5 is zero cross-controlled, after the light emitting element 5b has been turned ON, the triac 5a is turned ON when the voltage at both ends thereof become zero or thereabout. And, the triac 5a is maintained in the ON condition until the voltage of the power source becomes zero or thereabout (i.e., the current in the heater becomes zero) after the light emitting element 5b has been turned OFF. When the temperature of the thermistor 6 increases to increase the voltage $V_1$ higher than the voltage $V_2$, the comparator 7 is inverted to provide a LOW output. Consequently, the transistor 8 is turned OFF, thereby deenergizing the heater 3. Such condition is shown in FIG. 10.

In FIG. 10, A indicates a time point when the temperature adjustment is initiated by turning the switch 2 OFF in a condition that the temperatures of the heater 3, power thermistor 4 and the temperature detecting thermistor 6 are reduced to a room temperature; and B indicates a time point when the heater 3 is energized in a condition that the heater 3 is controlled substantially at the set temperature and the temperature of the temperature detecting thermistor 6 is substantially in the set value. The heater current in the time point A is shown in FIG. 8, and the heater current in the time point B is shown in FIG. 9. The power thermistor 4 is used to control the rush current to the heater. The power thermistor has a resistance of a few ohms when the temperature of the power thermistor itself is cooled to the room temperature. However, when the power thermistor is heated by the heater current, the resistance thereof is reduced below one ohm, thereby reducing the power consumption.

In the above-mentioned arrangement wherein the power thermistor 4 is connected to the heater 3 in series, since the current is always flowing in the power thermistor while the heater is being activated, the temperature of the power thermistor is considerably increased. Since the power thermistor has the thermal time constant larger than that of the heater, once the power thermistor has been heated up, it is not readily cooled. Accordingly, such arrangement provides the rush current controlling action when it is cooled to the room temperature (see FIG. 8). However, upon normal temperature adjustment, since the temperature of the heater is decreased to some extent but the temperature of the power thermistor itself is till high, the resistance thereof is small as mentioned above, with the result that the rush current control cannot be attained (see FIG. 9).

SUMMARY OF THE INVENTION

An object of the present invention is to provide a heater activating apparatus which can provide a rush current control to a heater for a long time.

Another object of the present invention is to provide a heater activating apparatus which can suppress the increase in temperature of a current controlling element.

A further object of the present invention is to provide a heater activating apparatus wherein the energization of a heater without a current passing through a controlling element and the energization of the heater with a current passing through the current controlling element can be selectively utilized.

Other objects of the present invention will be apparent from the following explanation.

DESCRIPTION OF THE PREFERRED EMBODIMENTS

The present invention will now be explained in connection with preferred embodiments thereof with reference to the accompanying drawings.

Figure 11:
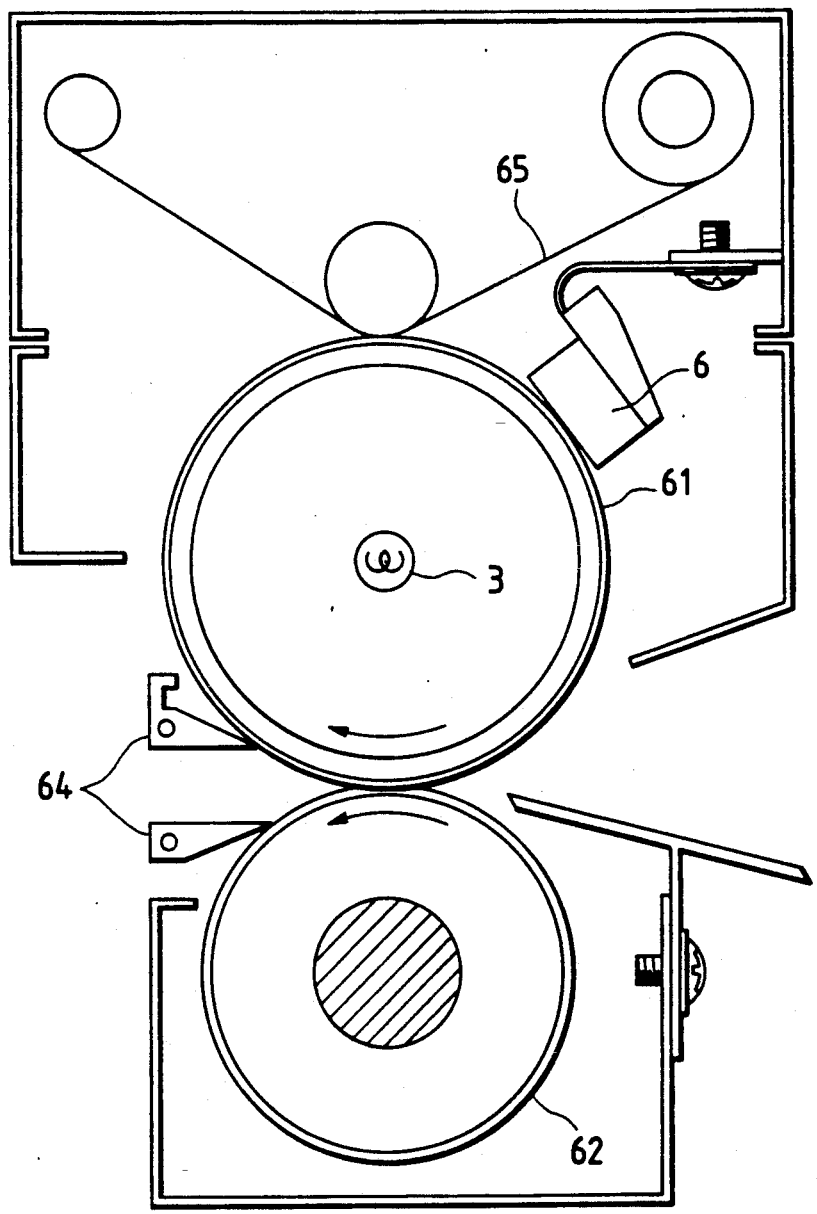
FIG. 11 is a sectional view of a heat fixing device using a heater activating apparatus according to the present invention.

FIG. 11 is a sectional view of a heat fixing device using a heater activating apparatus according to the present invention.

In FIG. 11, the reference numeral 61 denotes a heat roller including a halogen heater 3 therein; 62 denotes a pressure roller urged against the heat roller to form a nip therebetween; 64 denotes a separating claw for separating a recording medium or recording sheet; 65 denotes a web for cleaning a surface of the heat roller and for applying the separating agent to the surface of the heat roller; and 6 denotes a thermistor for detecting a surface temperature of the heat roller 61. On the basis of the detection output from the thermistor 6, by energizing or disenergizing the halogen heater 3, the surface of the heat roller 61 is maintained at a predetermined temperature.

The recording sheet on which an unfixed toner image is present is pinched by the nip between the heat roller 61 and the pressure roller 62 and is passed through the nip; meanwhile, the toner image is fixed to the recording sheet by heat and pressure.

Figure 1:
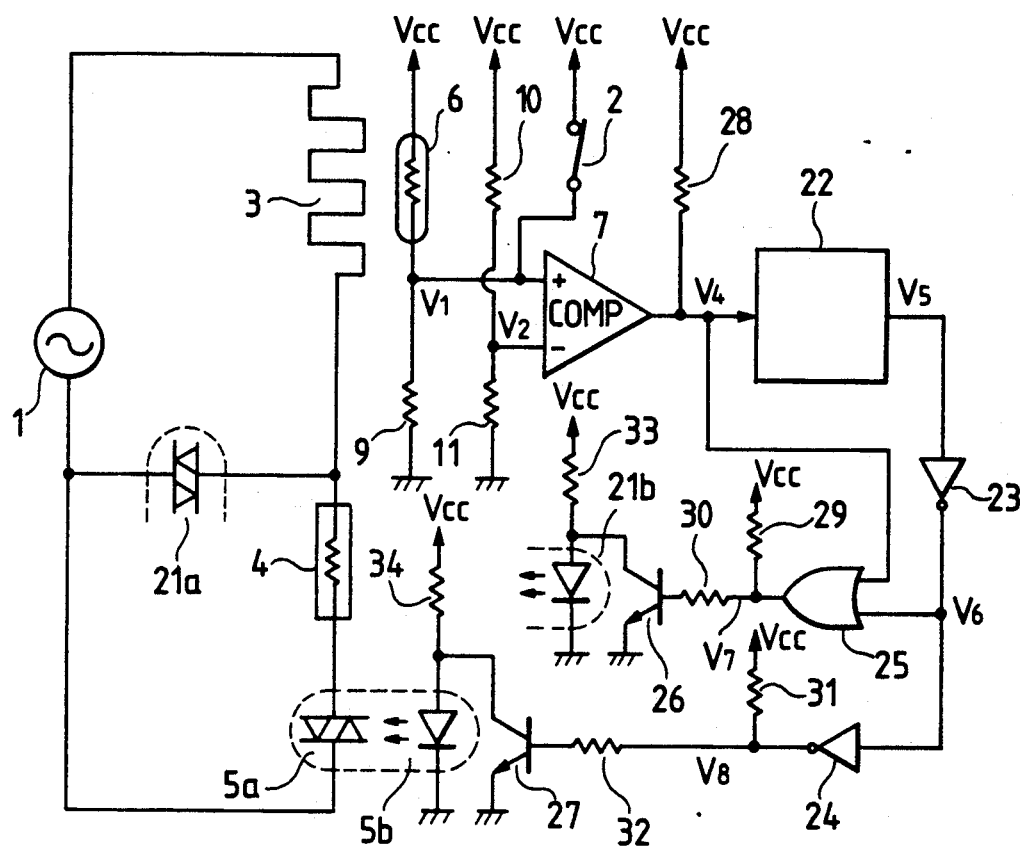
FIG. 1 is a circuit showing a heater activating apparatus according to a first embodiment of the present invention.

Next, a heater activating portion for activating the halogen heater 3 will be explained. FIG. 1 shows a circuit of the heater activating portion.

In FIG. 1, the reference numeral 21 denotes a zero cross-controlled SSR; 22 denotes a one-shot timer; 23, 24 denote inverters; 25 denotes an OR gate; 26, 27 denote transistors; and 28-34 denote resistors.

Figure 2:
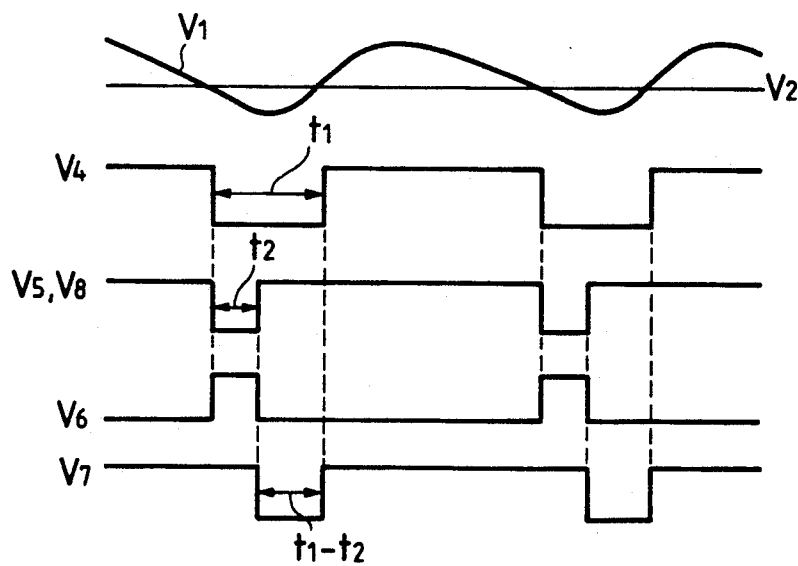
FIG. 2 is a graph showing voltage waves in various parts of the circuit of FIG. 1.

FIG. 2 shows voltage waves illustrating an example of the changes in voltage of various parts of the circuit of FIG. 1, regarding the time elapsed.

Now, the operation of the various parts will be explained with reference to FIGS. 1 and 2.

When the temperature of the temperature detecting thermistor 6 is high and the voltage $V_1$ is higher than the voltage $V_2$, the heater 3 remains in the OFF condition; however, if the temperature of the temperature detecting thermistor 6 is decreased and the voltage $V_1$ becomes lower than the voltage $V_2$, the comparator 7 outputs the LOW level signal. In this case, the one-shot timer 22 outputs a LOW pulse having a width or duration $t_2$ starting from the edge of the building-up wave of the voltage $V_4$. Since the voltage $V_6$ corresponds to the inversion of the voltage $V_5$ inverted in the inverter 23, the voltage $V_6$ has a HIGH pulse having a width $t_2$ starting from the edge of the building-up wave of the voltage $V_4$. Since the voltage $V_7$ is obtained by the voltages $V_4$ and $V_6$ treated by the OR gate, the voltage $V_7$ goes to a LOW level at the edge of the building-up wave of the voltage $V_6$, and returns to a HIGH level at the edge of the building-up wave of the voltage $V_4$. The voltage $V_8$ becomes a LOW pulse having a width $t_2$ starting from the edge of the building-up wave of the voltage $V_4$, similar to the voltage $V_5$. When the voltage $V_7$ becomes the LOW level, the transistor 26 is turned OFF to energize a light emitting element 21b, thus turning a triac 21a ON.

Further, when the voltage $V_8$ goes to the LOW level, the transistor 27 is turned OFF to energize a light emitting element 5b, thus turning a triac 5a ON. That is to say, during the turn-on time $t_1$, since the triac 5a is turned ON for the initial time duration $t_2$, the voltage from the power source 1 is applied to the heater 3 through the large electric power thermistor 4 having the resistance of negative temperature feature. After the time duration $t_2$, since the triac 5a is turned OFF and the triac 21a turned ON, the power thermistor 4 and the triac 5a are short-circuited so as not to allow the to flow therethrough, with the result that all of the voltage of the power source 1 is applied to the heater 3. That is to say, the power thermistor is connected to the heater in series for a time duration required to prevent the rush current to the heater.

Figure 3:
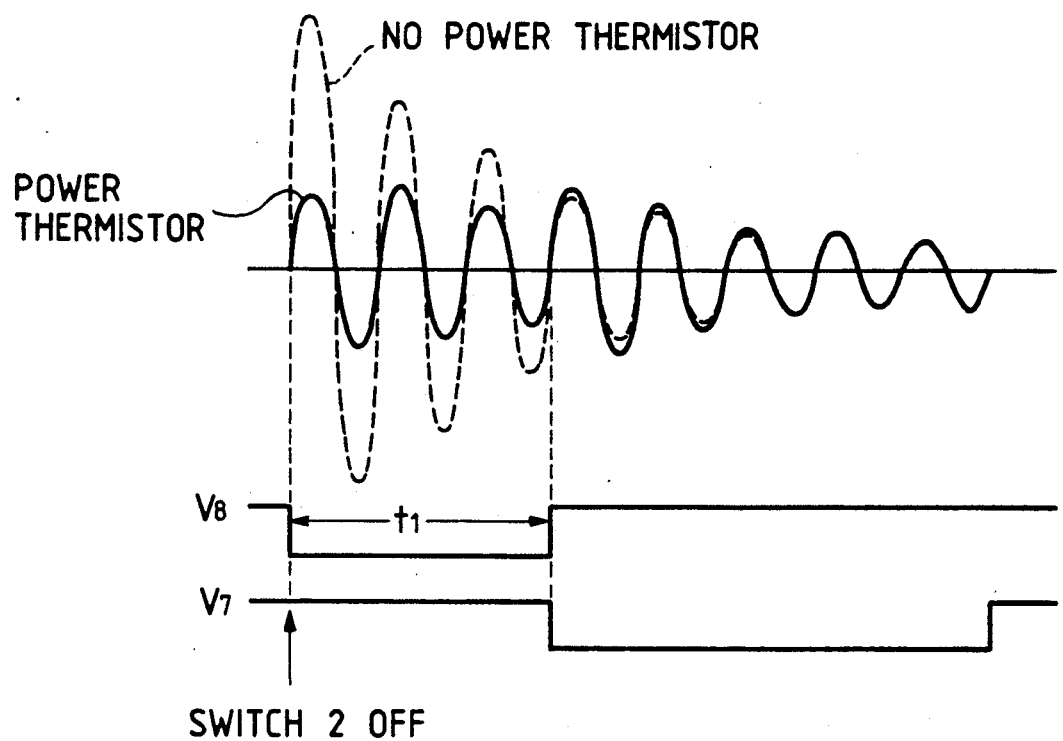
FIG. 3 is a graph showing a rush current controlling action in a room temperature.

FIG. 3 shows the rush current control effected when the switch 2 is turned from ON to OFF in a condition that all of the elements are at the room temperature. During the initial time duration $t_1$, since the power thermistor is connected to the heater 3 in series, the rush current to the heater is sufficiently suppressed. After the time duration $t_1$, since the triac 21a is turned ON to short-circuit the power thermistor 4 and the triac 5a, the current is increased; however, in this point, since the heater 3 has already been heated considerably, the amount of the current increased by releasing the power thermistor 4 is a little.

Figure 4:
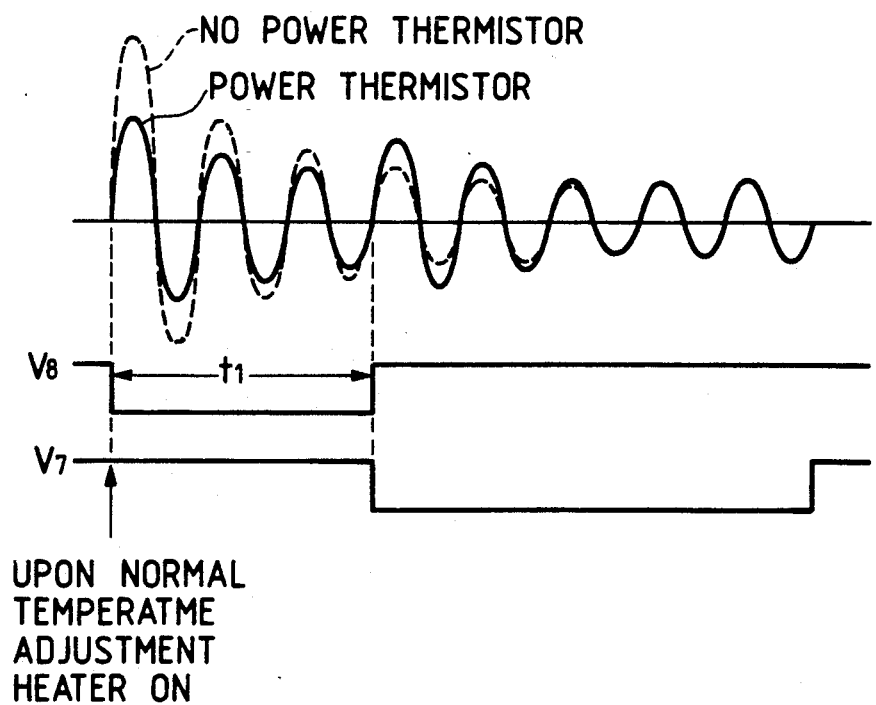
FIG. 4 is a graph showing a rush current controlling action in a normal temperature adjustment condition.

As apparent from FIG. 4 showing the rush current control during the normal temperature adjustment, since the current does not flowed through the power thermistor 4 except as necessary, the increase in the temperature is suppressed to the minimum. Accordingly, also in the normal temperature adjustment condition, the resistance of the power thermister is still high to provide the rush current control action.

As mentioned above, by energizing the power thermistor for a predetermined time duration during the heater energization, it is possible to suppress the temperature increase in the power thermistor to the minimum so that the rush current control can be provided even in the normal temperature adjustment condition.

Figure 5:
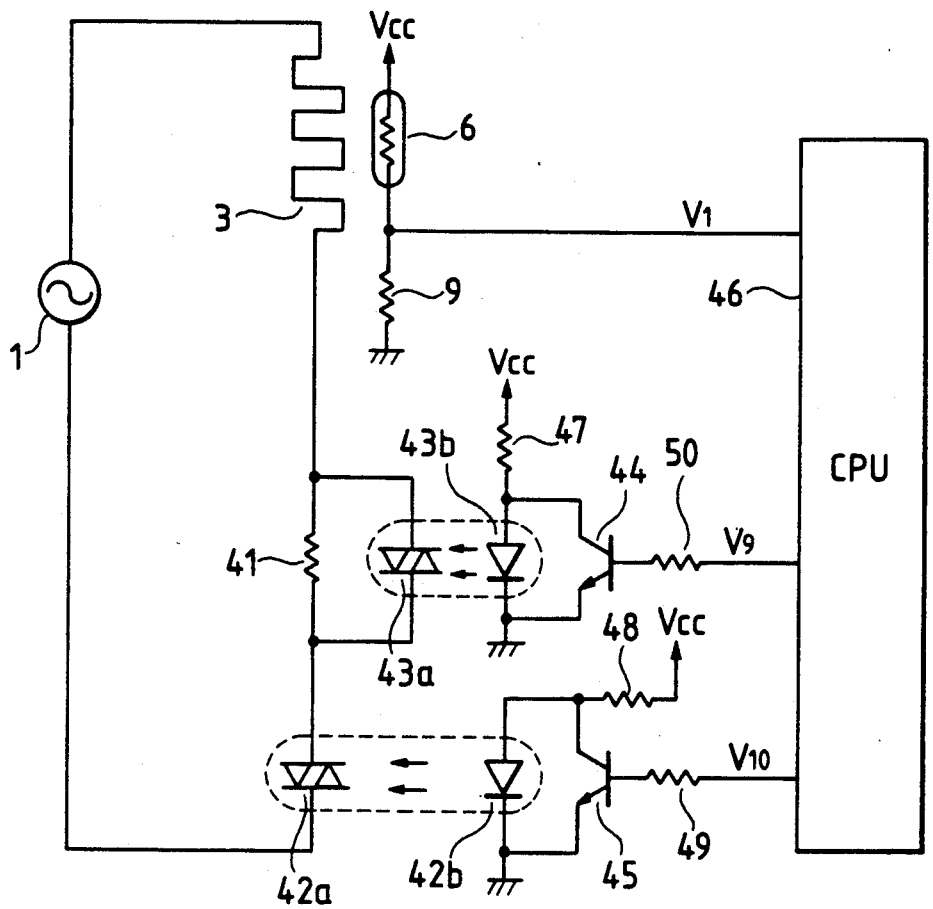
FIG. 5 is a circuit showing a heater activating apparatus according to a second embodiment of the present invention.

A heater activating apparatus according a second embodiment of the present invention is shown in FIG. 5.

In FIG. 5, the reference numeral 41 denotes a power resistor; 42, 43 denote zero cross-controlled SSRs; 44, 45 denote transistors; 46 denotes a CPU; and 47 through 50 denote resistors.

Figure 6:
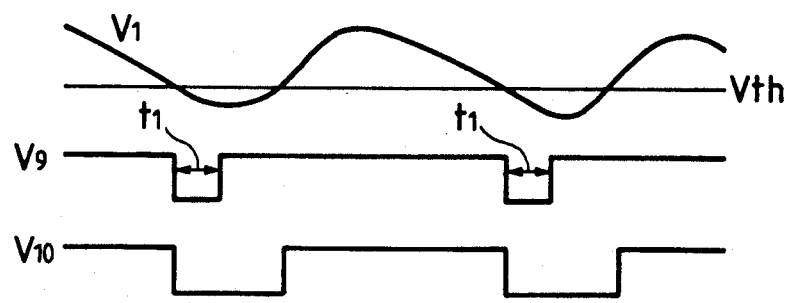
FIG. 6 is a graph showing voltage waves in various parts of the circuit of FIG. 5.
Figure 7:
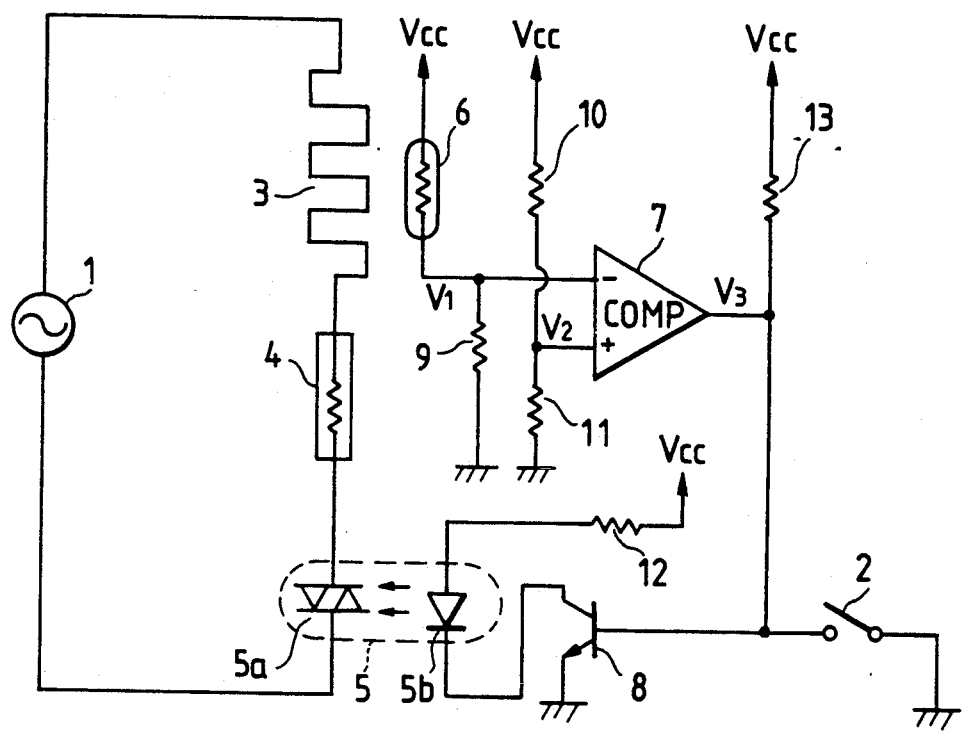
FIG. 7 is a circuit showing a heater activating apparatus relating to a background art for the present invention.
Figure 8:
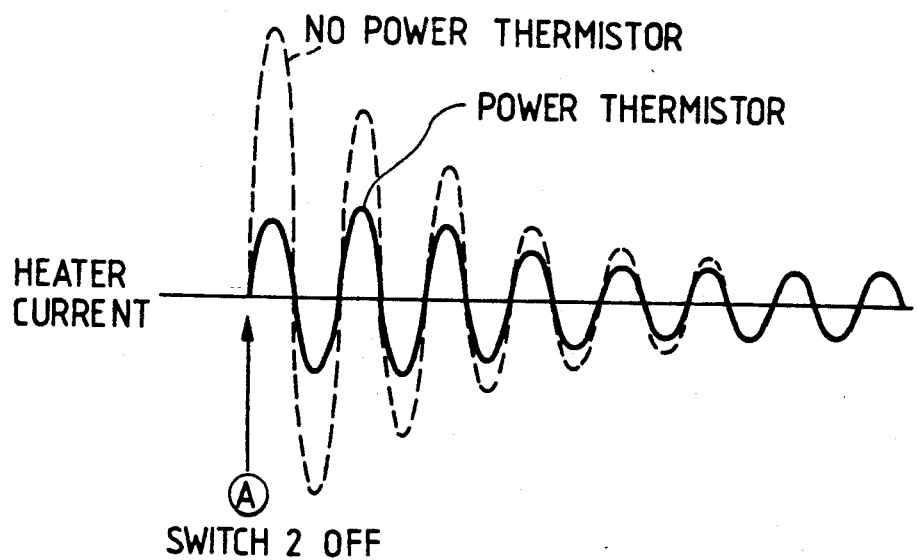
FIG. 8 is a graph showing a rush current controlling action in a room temperature.
Figure 9:
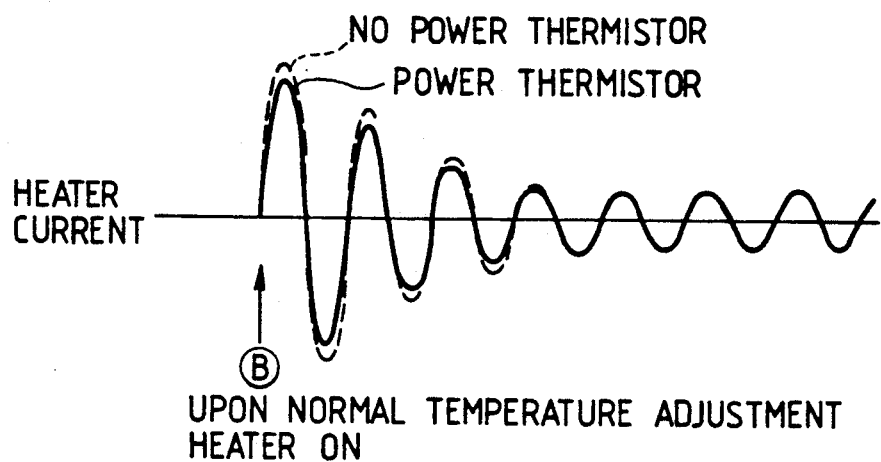
FIG. 9 is a graph showing a rush current controlling action in a normal temperature adjustment condition.
Figure 10:
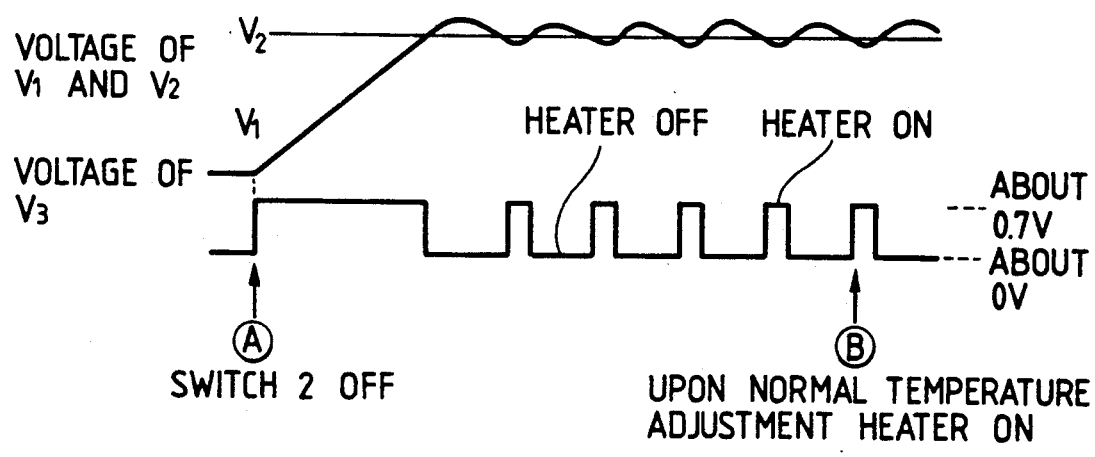
FIG. 10 is a graph showing voltage waves in various parts of the circuit of FIG. 7.

FIG. 6 shown voltage waves illustrating the changes in voltages of various parts of the apparatus of FIG. 5, regarding the time elapsed. Hereinafter, the second embodiment will be explained with reference to FIGS. 5 and 6.

In the above-mentioned first embodiment, while the arrangement wherein the power thermistor 4 and the triac 5a are short-circuited by the triac 21a was explained, in this second embodiment, only the current regulating power resistor 41 is short-circuited by a triac 43a. Thus, signals for activating triacs 42a, 43a will be as shown in FIG. 6. When the voltage $V_1$ is decreased below a predetermined voltage Vth, the CPU 46 changes the voltage $V_9$ and $V_{10}$ to LOW levels, respectively. The CPU controls the voltages in such a manner that the voltage $V_9$ is returned to a HIGH level when the time $t_1$ is elapsed after this voltage is changed to the LOW level, and the voltage $V_{10}$ is returned to a HIGH level when the voltage $V_1$ becomes higher than the voltage Vth.

Incidentally, in this embodiment, a power resistor is used in place of the power thermistor. When the power resistor is used for preventing the rush current, while, conventionally, the resistor having very high rated electric power was required, according to the present invention, since the power consumption of the power resistor is suppressed to the minimum, the resistor having the rated electric power considerably lower than a conventional one can be used, and the loss of the electric power can be reduced. Incidentally, in order to ensure the safety if the photo-triac 43a is damaged, the fuse resistor is used as the power resistor 41.

In this way, according to the present invention, it is possible to reduce the power consumption of the current regulating element, to suppress the increase in temperature of such element to the minimum, and to provide the effective rush current control.

As mentioned above, while the present invention has been explained with reference to the particular embodiments, the present invention is not limited to such embodiments, and various alterations and modifications can be adopted within the scope of the present invention.

What is claimed is:

1. A heater activating apparatus comprising:
   a power source;
   a heater for generating heat by application of a voltage provided from said power source and causing a current to flow therethrough;
   a current regulating element; and
   a timer driven by a driving signal for said heater;
   wherein the voltage from said power source is applied to said heater through said current regulating element only when said heater is initially energized, and thereafter changed over such that the voltage is applied to said heater without passing through said current regulating element, such change-over being effected after a predetermined time period determined by said timer.

2. A heater activating apparatus according to claim 1, further comprising a first circuit for applying the voltage from said power source to said heater through said current regulating element; a second circuit for applying the voltage from said power source to said heater without through said current regulating element; and selection means for selecting the energization of said heater by said first circuit and the energization of said heater by said second circuit.

3. A heater activating apparatus according to claim 1, wherein said heater is turned ON or OFF to maintain a heating element at a predetermined temperature.

4. A heater activating apparatus according to claim 3, wherein said heater is a heater adapted to heat said heating element for fixing a toner image onto a recording medium by heat.

5. A heater activating apparatus according to claim 1, wherein said heater comprises a halogen heater.

6. A heater activating apparatus, comprising:
   a power source;
   a heater heated by application of a voltage from said power source and causing a current to flow therethrough;
   a power thermistor; and
   a timer driven by a driving signal for said heater,
   wherein the voltage from said power source is applied to said heater through said power thermistor element only when said heater is initially energized, and, after a predetermined time period determined by said timer, the voltage is applied to said heater without passing through said power thermistor.

7. A heater activating apparatus according to claim 6, further comprising:
   a first circuit for applying the voltage from said power source to said heater through said power thermistor;
   a second circuit for applying the voltage from said power source to said heater without passing through said power thermistor; and
   selection means for selecting the energization of said heater by said first circuit and the energization of said heater by said second circuit.

8. A heater activating apparatus according to claim 6, wherein said heater comprises a heating element, wherein said heater is turned ON and OFF to maintain said heating element at a predetermined temperature.

9. A heater activating apparatus according to claim 9, wherein said heater is a heater adapted to a heat said heating element for fixing a toner image onto a recording medium by heat.

10. A heater activating apparatus according to claim 6, wherein said heater comprises a halogen heater.

11. A heater activating apparatus, comprising:
    an AC power source;
    a heater generating heat by application of AC voltage from said AC power source;
    a current regulating element;
    selection means for selecting a first transmission path for applying an AC voltage from said AC power source to said heater through said current regulating element, or a second transmission path for applying the AC voltage without passing through said current regulating element; and
    a timer driven by a driving signal for said heater, and the energization of aid heater through said current regulating element is changed over by said selection means to the energization of said heater without passing through said current regulating element, after a predetermined timer period determined by said timer.

12. A heater activating apparatus according to claim 11, wherein said selection means has an interruption member for interrupting current to said current regulating element.

13. A heater activating apparatus according to claim 12, wherein said interruption member comprises a triac.

14. A heater activating apparatus according to claim 11, wherein said current regulating element comprises a power thermistor.

15. A heat activating apparatus according to claim 11, wherein said heater comprises a heating element, and wherein said heater is turned ON and OFF to maintain a heating element at a predetermined temperature.

16. A heat activating apparatus according to claim 15, wherein said heater is a heater adapted to heat said heating element for fixing a toner image onto a recording medium by heat.

17. A heat activating apparatus according to claim 11, wherein said heater comprises a halogen heater.

18. A temperature control apparatus, comprising:
    an AC power source;

a heater for generating heat by application of an AC voltage from said AC power source;

a heat member to be heated by said heater;

a temperature detection member for detecting a temperature of said heat member; and power supply control means for ON-OFF controlling said AC power source in accordance with the detected temperature so that the detected temperature of said temperature detection member is maintained at a set temperature, said power supply control means having a first transmission path for applying the power from said AC voltage source through a current regulating element, and a second transmission path for applying the power from said AC voltage source without passing through said current regulating element, wherein after the power is supplied through said first transmission path, the power source is switched to said second transmission path every time said power supply control is in the ON state.

19. A temperature control apparatus according to claim 18, wherein said AC power source has a interruption member for interrupting the current to said current regulating element.

20. A temperature control means according to claim 19, wherein said interruption member is a triac.

21. A temperature control apparatus according to claim 18, further comprising a timer driven by a driving signal for said heater, and changing means for changing said AC power source by said first transmission path to said second transmission path after a lapse of a predetermined time period determined by said timer.

22. A temperature control apparatus according to claim 18, wherein said current regulating element is a power thermistor.

23. A temperature control apparatus according to claim 18, wherein said heater is a heater adapted to heat said heating element for thermally fixing a toner image onto a recording medium by heat.

24. A temperature control apparatus according to claim 18, wherein said heater is a halogen heater.

* * * * *

UNITED STATES PATENT AND TRADEMARK OFFICE
CERTIFICATE OF CORRECTION

PATENT NO. : 5,229,578    Page 1 of 2
DATED : July 20, 1993
INVENTOR(S) : AKIHISA KUSANO, ET AL.

It is certified that error appears in the above-indentified patent and that said Letters Patent is hereby corrected as shown below:

[57] ABSTRACT
    Line 2, "applied to voltage" should read --applied a voltage--.
    Line 6, "to" should be deleted.

COLUMN 4
    Line 15, "the to" should read --the current to--.
    Line 35, "flowed" should read --flow--.
    Line 39, "thermister" should read --thermistor--.

COLUMN 5
    Line 50, "without through" should read --without passing through--.

UNITED STATES PATENT AND TRADEMARK OFFICE
CERTIFICATE OF CORRECTION

PATENT NO. : 5,229,578
DATED : July 20, 1993
INVENTOR(S) : AKIHISA KUSANO, ET AL.

It is certified that error appears in the above-indentified patent and that said Letters Patent is hereby corrected as shown below:

COLUMN 6
   Line 42, "aid" should read --said--.

COLUMN 8
   Line 2, "a" should read --an--.

Signed and Sealed this

Twelfth Day of April, 1994

*Attest:*

BRUCE LEHMAN

*Attesting Officer*     Commissioner of Patents and Trademarks